United States Patent [19]

Zimmerman et al.

[11] Patent Number: 4,789,689
[45] Date of Patent: Dec. 6, 1988

[54] AMINE CATALYST FOR URETHANES

[75] Inventors: Robert L. Zimmerman; Terry L. Renken, both of Austin, Tex.

[73] Assignee: Texaco Inc., White Plains, N.Y.

[21] Appl. No.: 113,854

[22] Filed: Oct. 29, 1987

[51] Int. Cl.$^4$ .............................. C08J 9/00; C08K 9/00
[52] U.S. Cl. ........................................ 521/115; 521/88
[58] Field of Search .................................. 521/115, 88

[56] References Cited

U.S. PATENT DOCUMENTS

| | | | |
|---|---|---|---|
| 3,330,782 | 7/1967 | Poppelsdorf | 521/115 |
| 3,786,005 | 1/1974 | Bechara et al. | |
| 3,912,689 | 10/1975 | Bechara et al. | |
| 3,925,268 | 12/1975 | Rosemund et al. | |
| 4,011,223 | 3/1977 | Priest et al. | |
| 4,012,445 | 3/1977 | Priest et al. | |
| 4,022,720 | 5/1977 | Blahak et al. | |
| 4,026,840 | 5/1977 | Bechara et al. | |
| 4,033,911 | 7/1977 | Sandner et al. | |
| 4,038,210 | 7/1977 | Rosemund et al. | |
| 4,048,107 | 9/1977 | Babiec, Jr. et al. | |
| 4,080,381 | 3/1978 | Burke et al. | 564/8 |
| 4,115,321 | 9/1978 | Sandner et al. | 521/115 |
| 4,122,038 | 10/1978 | Sandner et al. | |
| 4,186,254 | 1/1980 | Cuscurida et al. | |
| 4,380,591 | 4/1983 | Baskent et al. | 521/115 |
| 4,436,842 | 3/1984 | Harwell | 521/115 |
| 4,510,269 | 4/1985 | Kopp et ala. | 521/115 |
| 4,707,501 | 11/1987 | Petrella et al. | 521/115 |
| 4,714,719 | 12/1987 | Yamasaki et al. | 521/115 |
| 4,719,244 | 1/1988 | Muller et al. | 521/115 |

Primary Examiner—Harold D. Anderson
Assistant Examiner—Dennis R. Daley
Attorney, Agent, or Firm—Jack H. Park; Kenneth R. Priem

[57] ABSTRACT

Covers a method of producing a polyurethane by utilizing specific amine compounds of high activity as a catalyst in reacting an organic polyisocyanate with an organic polyester polyol or polyether polyol in the presence of said catalyst. Said amines fall within the following structural formula:

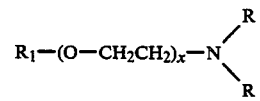

where $R_1$ and R are lower alkyl and x is 2–4.

4 Claims, No Drawings

AMINE CATALYST FOR URETHANES

BACKGROUND OF THE INVENTION

1. Field of the Invention

This invention pertains to the field of urethane catalysts. More particularly, this invention relates to the use of certain amine derivatives as a urethane catalyst.

2. Description of the Prior Art

The use of a catalyst in preparing polyurethanes by the reaction of a polyisocyanate, a polyol and perhaps other ingredients is known. The catalyst is employed to promote at least two, and sometimes three major reactions that must proceed simultaneously and competitively at blanced rates during the process in order to provide polyurethanes with the desired physical characteristics. One reaction is a chain-extending isocyanate-hydroxyl reaction by which a hydroxyl-containing molecule is reacted with an isocyanat-containing molecule to form a urethane. This increases the viscosity of the mixture and provides a polyurethane containing secondary nitrogen atom in the urethane groups. A second reaction is a crosslinking isocyanate urethane reaction by which an isocyanate-containing molecule reacts with a urethane group containing a secondary nitrogen atom. The third reaction which may be involved is an isocyanate-water reaction by which an isocyanate-terminated molecule is extended and by which carbon dioxide is generated to blow or assist in the blowing of foam. This third reaction is not essential if an extraneous blowing agent, such as a halogenated, normally liquid hydrocarbon, carbon dioxide, etc., is employed, but is essential if all or even part of the gas for foam generation is to be generated by this in situ reaction (e.g. in the preparation of "one-shot" flexible polyurethane foams).

The reactions must proceed simultaneously at optimum balanced rates relative to each other in order to obtain a good foam structure. If carbon dioxide evolution is too rapid in comparison with chain extension, the foam will collapse. If the chain extension is too rapid in comparison with carbon dioxide evolution, foam rise will be restricted, resulting in a high density foam with a high percentage of poorly defined cells. The foam will not be stable in the absence of adequate crosslinking.

It has long been known that tertiary amines are effective for catalyzing the second crosslinking reaction. Typical amines of this type are found in U.S. Pat. Nos. 4,012,445; 3,925,268; 3,786,005; 4,011,223; 4,048,107; 4,038,210; 4,033,911; 4,026,840; 4,022,720 and 3,912,689.

U.S. Pat. No. 4,186,254 discloses a method for making polyurethane foams using a catalyst of the structure

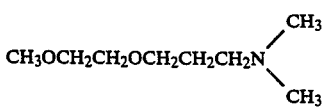

Also U.S. Pat. No. 4,122,038 discloses the manufacture of polyurethane foams using a catalyst of the following structure:

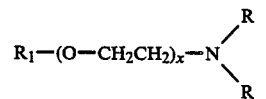

This invention reveals a new amine compound which has structural similarity to the '254 and '038 patents just mentioned but which has a significantly higher activity.

SUMMARY OF THE INVENTION

A class of amine compounds have been discovered to be useful as polyurethane catalysts. Said amines fall within the following structural formula:

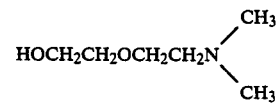

where $R_1$ and R are lower alkyl and $x = 2-4$.

DESCRIPTION OF THE PREFERRED EMBODIMENTS

The compounds described in the Summary of the Invention may be prepared by resort to a wide variety of synthetic techniques. Specifically, they are prepared by first aminating an alkylethoxylate as described in U.S. Pat. No. 4,618,717. The primary amine is then reductively aminated using an alkyl aldehyde, hydrogen and a hydrogenation catalyst. To prepare the methyl derivative, formaldehyde is the aldehyde used. The crude tertiary amine is purified by distillation.

Preferably $R_1$ and R contain 4 carbon atoms, more preferably are methyl or ethyl and most preferably are methyl.

The compounds here possess a number of useful characteristics making them exceptionally attractive as polyurethane catalysts. For example, they have high catalytic activity in the polyurethane reaction.

To prepare polyurethanes using the catalysts here, any aromatic polyisocyanate may be used. Typical aromatic polyisocyanates include m-phenylene diisocyanate, p-phenylene diisocyanate, polymethylene polyphenylisocyanate, 2,4-toluene diisocyanate, 2,6-toluene diisocyanate, dianisidine diisocyanate, bitolylene diisocyanate, naphthalene-1,4-diisocyanate, xylylene-1,4-diisocyanate, xylylene-1,3-diisocyanate, bis(4-isocyanatophenyl)methane, bis(3-methyl-4-isocyanatophenyl)methane, bis(3-methyl-4-isocyanatophenyl)methane, and 4,4'-diphenylpropane diisocyanate.

Greatly preferred aromatic polyisocyanates used in the practice of the invention are 2,4- and 2,6-toluene diisocyanates and methylene-bridged polyphenyl polyisocyanate mixtures which have a functionality of from about 2 to 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents, for example, U. S. Pat. Nos. 2,683,730; 2,950,263; 3,012,008; 3,344,162 and 3,362,979.

Most preferred methylene-bridged polyphenyl polyisocyanate mixtures used here contain about 20 to about 100 weight percent methylene diphenyldiisocyanate isomers, with the remainder being polymethylene polyphenyl polyisocyanates having higher functionalities and higher molecular weights. Typical of these are polyphenyl polyisocyanate mixtures containing about 20 to 100 weight percent methylene diphenyldiisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. No. 3,362,979, issued Jan. 9, 1968 to Floyd E. Bentley.

The hydroxyl-containing polyol component which reacts with the isocyanate may suitably be a polyester polyol or a polyether polyol having a hydroxyl number ranging from about 700 to about 25, or lower. When it is desired to provide a flexible foam, the hydroxyl number is preferably in the range from about 25 to 60. For rigid foams, the hydroxyl number is preferably in the range from 350 to 700. Semi-rigid foams of a desired flexibility are provided when the hydroxyl number is intermediate to the ranges just given. Also for a flexible urethane foam, the polyol should preferably have an average functionality of from about 2 to about 4 and a molecular weight of from about 2,000 to about 6,000. For rigid foams, the functionality of the polyol component is preferably from about 4 to about 8.

When the polyol is a polyester, it is preferable to use as the polyester, a resin having a relatively high hydroxyl value and a relatively low acid value made from the reaction of a polycarboxylic acid with a polyhydric alcohol. The acid component of the polyester is preferably of the dibasic or polybasic type and is usually free of reactive unsaturation, such as ethylenic groups or acetylenic groups. The unsaturation, such as occurs in the rings of such aromatic acids as phthalic acid, terephthalic acid, isophthalic acid, or the like, is non-ethylenic and non-reactive. Thus, aromatic acids may be employed for the acid component. Aliphatic acids, such as succinic acid, adipic acid, sebacic acid, azelaic acid, etc. may also be employed and are preferred. The alcohol component for the polyester should preferably contain a plurality of hydroxyl groups and is preferably an aliphatic alcohol, such as ethylene glycol, glycerol, pentaerythritol, trimethylolethane, trimethylolpropane, mannitol, sorbitol, or methyl glucoside. Mixtures of two or more of the above identified alcohols may be employed also if desired.

When the hydroxyl-containing component is a polyether polyol for use in flexible polyurethane foam, the polyol may be an alkylene oxide adduct of a polyhydric alcohol with a functionality of from about 2 to about 4. The alkylene oxide may suitably be ethylene oxide, propylene oxide, or 1,2-butylene oxide, or a mixture of some or all of these. The polyol will suitably have a molecular weight within the range of from about 2,000 to about 7,000. For flexible polyether polyurethane foams, the alkylene oxide is preferably propylene oxide or a mixture of propylene oxide and ethylene oxide.

For rigid polyether polyurethane foams, the polyol should have a functionality of from about 4 to about 8 and a molecular weight of from about 300 to about 1,200. Polyols for rigid polyether polyurethane foams may be made in various ways including the addition of an alkylene oxide as above to a polyhydric alcohol with a functionality of from 4 to 8. These polyols may also be, for example, Mannich condensation products of a phenol, an alkanolamine, and formaldehyde, which Mannich condensation product is then reacted with an alkylene oxide (see U.S. Pat. No. 3,297,597).

The amount of hydroxyl-containing polyol compound to be used relative to the isocyanate compound in both polyester and polyether foams normally should be such that the isocyanate groups are present in at least an equivalent amount, and preferably, in slight excess, compared with the free hydroxyl groups. Preferably, the ingredients will be proportioned so as to provide from about 0.9 to about 1.5 mole equivalents of isocyanate groups per mole equivalent of hydroxyl groups. However, for certain shock absorbing foams we have found that by using the catalyst of our invention the mole equivalents of isocyanate to hydroxyl groups can be as low as 0.4.

When water is used, the amount of water, based on the hydroxyl compound, is suitably within the range of about 0.05 mole to about 10.0 moles per mole equivalent of hydroxy compound.

It is within the scope of the present invention to utilize an extraneously added inert blowing agent such as a gas or gas-producing material. For example, halogenated low-boiling hydrocarbons, such as trichloromonofluoromethane and methylene chloride, carbon dioxide, nitrogen, etc. may be used. The inert blowing agent reduces the amount of excess isocyanate and water that is required in preparing flexible urethane foam. For a rigid foam, the use of water is often avoided and the extraneous blowing agent is used exclusively. Selection of the proper blowing agent is well within the knowledge of those skilled in the art. See for example U.S. Pat. No. 3,072,082.

The catalysts discovered here which are useful in the preparation of rigid or flexible polyester or polyether polyurethane foams, based on the combined weight of the hydroxyl-containing compound and polyisocyanate are employed in an amount of from about 0.03 to about 4.0 weight percent. More often, the amount of catalyst used is 0.10 to about 2.0 weight percent.

The catalysts of this invention may be used either alone or in a mixture with one or more other catalysts such as tertiary amines or with an organic tin compound or other polyurethane catalysts. The organic tin compound, particularly useful in making flexible foams may suitably be a stannous or stannic compound, such as a stannous salt of a carboxylic acid, a trialkyltin oxide, a dialkyltin dihalide, a dialkyltin oxide, etc., wherein the organic groups of the organic portion of the tin compound are hydrocarbon groups containing from 1 to 8 carbon atoms. For example, dibutyltin dilaurate, dibutyltin diacetate, diethyltin diacetate, dihexyltin diacetate, di-2-ethylhexyltin oxide, dioctyltin dioxide, stannous octoate, stannous oleate, etc., or a mixture thereof, may be used.

Such tertiary amines include trialkylamines (e.g., trimethylamine, triethylamine), heterocyclic amines, such as N-alkylmorpholines (e.g., N-methylmorpholine, N-ethylmorpholine, etc.), 1,4-dimethylpiperazine, triethylenediamine, etc., and aliphatic polyamines, such as N,N,N'N'-tetramethyl-1,3-butanediamine.

Conventional formulation ingredients are also employed, such as, for example, foam stabilizers, also known as silicone oils or emulsifiers. The foam stabilizer may be an organic silane or siloxane. For example, compounds may be used having the formula:

$$RSi[O-(R_2SiO)_n-(oxyalkylene)_m R]_3$$

wherein R is an alkyl group containing from 1 to 4 carbon atoms; n is an integer of from 4 to 8; m is an integer of from 20 to 40; and the oxyalkylene groups are derived from propylene oxide and ethylene oxide. See, for example, U.S. Pat. No. 3,194,773.

In preparing a flexible foam, the ingredients may be simultaneously, intimately mixed with each other by the so-called "one-shot" method to provide a foam by a one-step process. In this instance, water should comprise at least a part (e.g. 10% to 100%) of the blowing agent. The foregoing methods are known to those skilled in the art, as evidenced by the following publication: duPont Foam Bulletin, "Evaluation of Some Polyols in One-Shot Resilient Foams", Mar. 22, 1960.

When it is desired to prepare rigid foams, the "one-shot" method or the so-called "quasi-prepolymer method" is employed, wherein the hydroxyl-containing component preferably contains from about 4 to 8 reactive hydroxyl groups, on the average, per molecule.

In accordance with the "quasi-prepolymer method", a portion of the hydroxyl-containing component is reacted in the absence of a catalyst with the polyisocyanate component in proportions so as to provide from about 20 percent to about 40 percent of free isocyanato groups in the reaction product, based on the polyol. To prepare a foam, the remaining portion of the polyol is added and the two components are allowed to react in the presence of catalytic systems such as those discussed above and other appropriate additives, such as blowing agents, foam stabilizing agents, fire retardants, etc. The blowing agent (e.g., a halogenated lower aliphatic hydrocarbon), the foam-stabilizing agent, the fire retardant, etc., may be added to either the prepolymer or remaining polyol, or both, prior to the mixing of the component, whereby at the end of the reaction a rigid polyurethane foam is provided.

Urethane elastomers and coatings may be prepared also by knwn techniques in accordance with the present invention wherein a tertiary amine of this invention is used as a catalyst. See, for example, duPont Bulletin PB-2, by Remington and Lorenz, entitled "The Chemistry of Urethane Coatings".

The invention will be illustrated further with respect to the following specific examples, which are given by way of illustration and not as limitations on the scope of this invention.

The following examples show the use of a type of compound of this invention as urethane catalysts compared with other catalysts.

EXAMPLE 1

Flexible polyurethane foams were prepared by initimately mixing the ingredients according to the six formulations below.

| | A | B | C | D | E | F |
|---|---|---|---|---|---|---|
| THANOL ® F-3016 | 100 | 100 | 100 | 100 | 100 | 100 |
| Silwet ® L-711 | 1.0 | 1.0 | 1.0 | 1.1 | 1.1 | 1.1 |
| Water | 4.0 | 4.0 | 4.0 | 2.1 | 2.1 | 2.1 |
| Stannous Octoate | 0.2 | 0.2 | 0.2 | 0.35 | 0.35 | 0.35 |
| $CH_3OCH_2CH_2OCH_2CH_2N(CH_3)_2$ | 0.27 | — | — | 0.30 | — | — |
| $CH_3OCH_2CH_2OCH_2CH_2CH_2N(CH_3)_2$ (U.S. Pat. No. 4,186,254) | — | 0.40 | — | — | 0.50 | — |
| $HOCH_2CH_2OCH_2CH_2N(CH_3)_2$ (U.S. Pat. No. 4,122,038) | — | — | 0.33 | — | — | 0.45 |
| Methylene chloride | — | — | — | 8.0 | 8.0 | 8.0 |
| Toluene diisocyanate | 52 | 52 | 52 | 30.5 | 30.5 | 30.5 |
| Cream time (sec) | 10 | 10 | 10 | 11 | 11 | 11 |
| Rise time (sec) | 95 | 100 | 100 | 130 | 128 | 128 |
| meq amine used per 100 g polyol | 1.84 | 2.48 | 2.48 | 2.04 | 3.11 | 3.38 |

Comparing A, B and C it can be seen that far less meq of amine are required when the compound of this invention is used. Column A uses the compound of this invention. B and C are similar compounds described in the prior art.

Comparing D, E and F, this is also true, far less meq of amine are required of the compound of this invention than prior art compounds.

| GLOSSARY | |
|---|---|
| THANOL ® F-3016 | A 3000 molecular weight polyol made by adding ethylene oxide and propylene oxide to glycerine. |
| Silwet ® L-711 | A silicone surfactant sold by Union Carbide Corp. |

We claim:

1. A method for producing a polyurethane foam which comprises reacting an organic polyisocyanate with a polyester polyol or polyether polyol in the presence of a catalytic amount of an amine of the following formula:

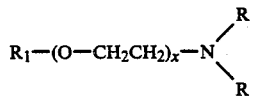
where $R_1$ and $R$ are lower alkyl and x is 2–4.
2. A method of claim 1 wherein the polyol is a polyester polyol.
3. A method of claim 1 wherein the polyol is a polyether polyol.
4. The method of claim 1 wherein the amine has the structure.
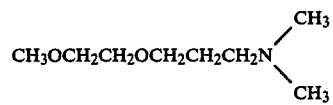
* * * * *